United States Patent [19]

Muko

[11] 4,065,870
[45] Jan. 3, 1978

[54] FISH-FEEDER

[76] Inventor: Sakae Muko, 515, Kamitsutsui, Oonojo, Fukuok, Japan

[21] Appl. No.: 750,781

[22] Filed: Dec. 15, 1976

Related U.S. Application Data

[63] Continuation-in-part of Ser. No. 595,245, July 11, 1975, Pat. No. 4,017,999.

[51] Int. Cl.² ............................................. A01K 97/02
[52] U.S. Cl. ................................................ 43/44.99
[58] Field of Search ................. 43/44.99, 43.14, 43.12, 43/43.11, 41.2

[56] References Cited

U.S. PATENT DOCUMENTS

| | | | |
|---|---|---|---|
| 2,457,715 | 12/1948 | Pazzano | 43/43.11 |
| 2,941,327 | 6/1960 | Rundell | 43/44.99 |
| 3,163,957 | 1/1965 | Barrett | 43/41.2 |

Primary Examiner—Warner H. Camp
Attorney, Agent, or Firm—Frank J. Jordan

[57] ABSTRACT

A fish-feeder includes a bell-shaped container and a bottom lid which is pivotally secured to the container whereby the bait which is initially dispersed in the container is released in the water when the bottom lid is opened.

10 Claims, 22 Drawing Figures

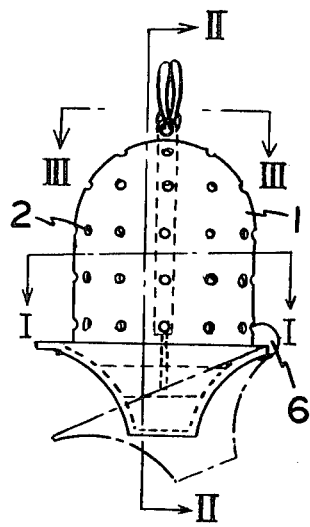
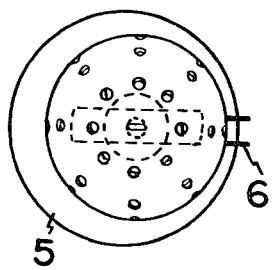
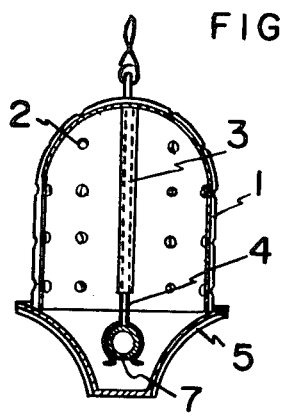
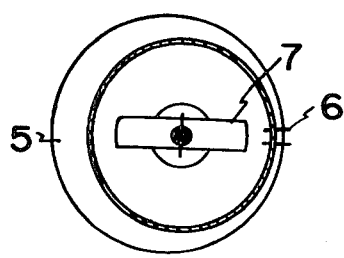
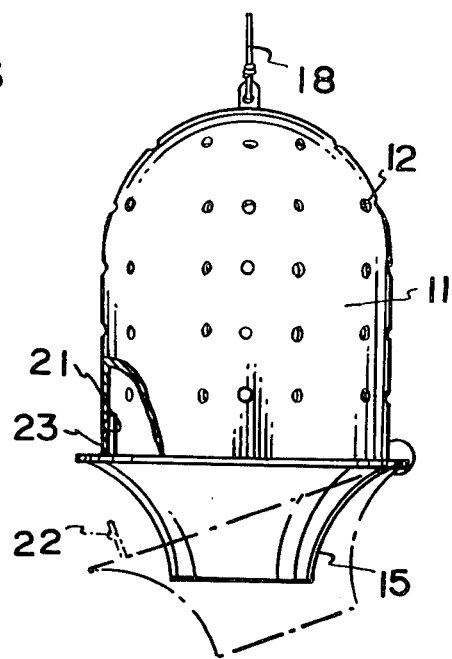

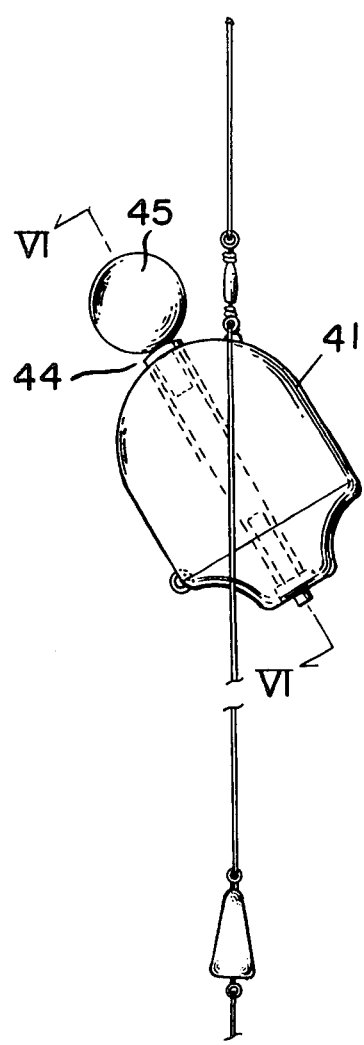
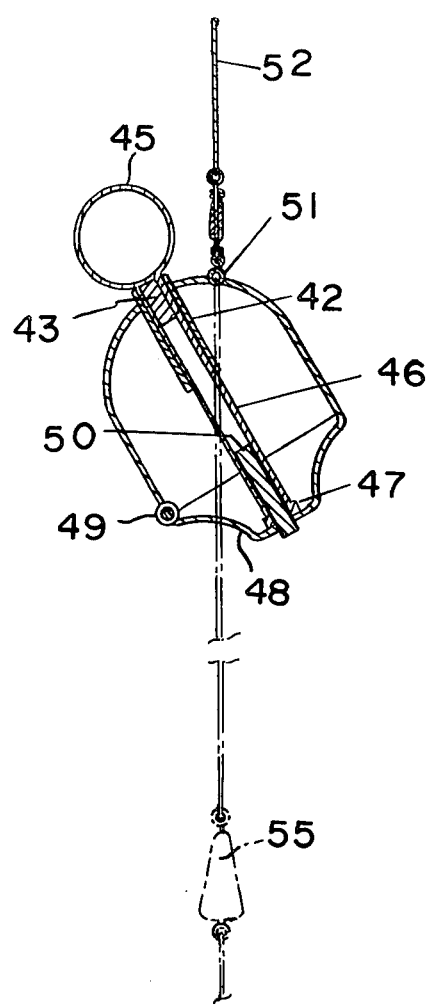

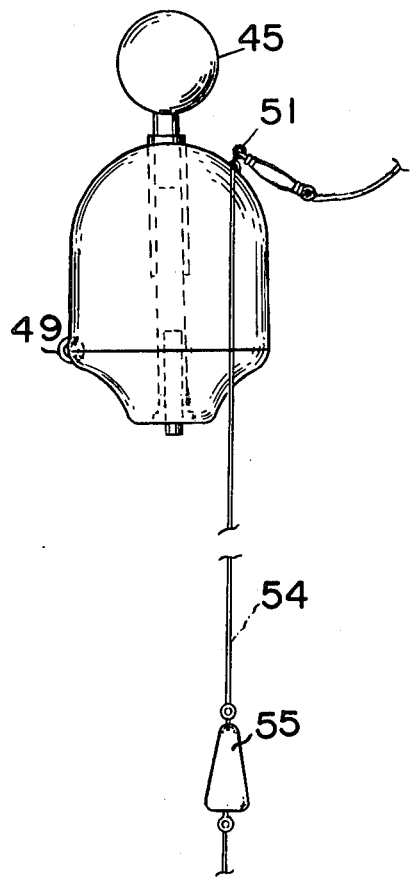
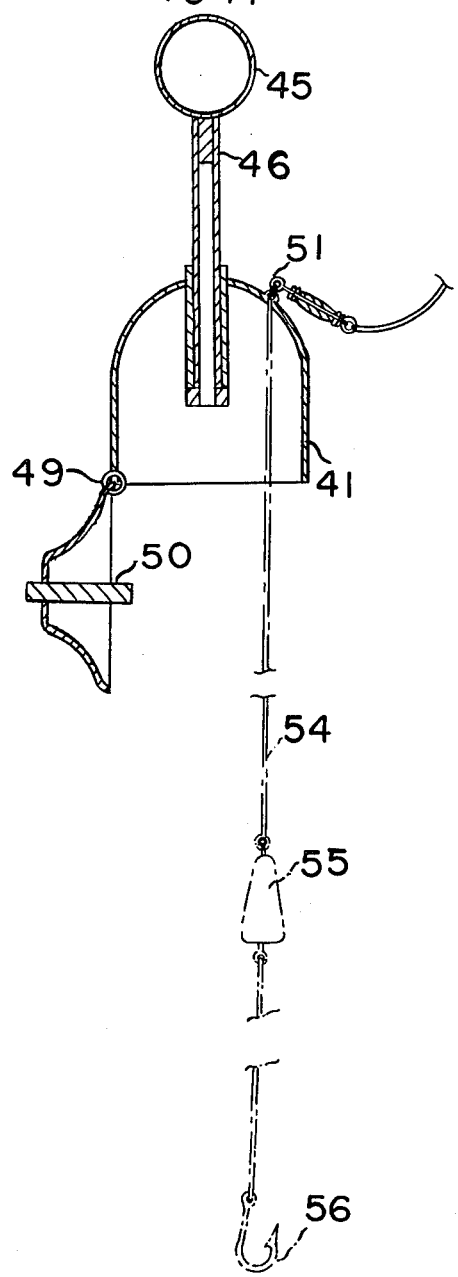

4,065,870

FISH-FEEDER

This is a continuation-in-Part application of Ser. No. 595,245 filed July 11, 1975 now U.S. Pat. No. 4017 999.

BACKGROUND OF THE INVENTION

This invention relates to a device for feeding bait to fish.

Presently with the increase of leisure time, fishing has been spotlighted as a way to spend such leisure time. For catching a number of fish, there have been several types of fish-feeders which are available. However, conventional fish-feeders have lids from which the bait is discharged into the water at the side of the device. Therefore when they are cast into the water surface, and the lid is opened for discharging bait from the container, most of the bait passes in a direction of the water tide resulting in a small amount of bait which settles downwardly to a required position in the water.

Accordingly, it is an object of the present invention to provide a fish-feeder which mainly comprises a container, a bottom lid on the container, and an opening means which automatically discharges the bait to a required position in the water after the fish-feeder has been cast into the water.

Another object of the present invention is to provide a fish-feeder which is simple in construction and which is entirely free from mechanical troubles.

BRIEF DESCRIPTION OF THE DRAWINGS

FIG. 1 is a front view of a fish-feeder according to a first embodiment of the present invention.

FIG. 2 is a transverse cross-sectional view of the fish-feeder taken along the line I—I of FIG. 1.

FIG. 3 is a longitudinal cross-sectional view taken along the line II—II of FIG. 1.

FIG. 4 is a transverse cross-sectional view of the fish-feeder taken along the line III—III of FIG. 1.

FIG. 5A is a partial front view partly broken away of a second embodiment showing the engagement of the swinging portion of the container and the perpendicular plate jutting from the rim portion of the bottom lid.

FIG. 10 is a front view of a fish-feeder in a slanted position according to a fourth embodiment of the present invention.

FIG. 12 is a longitudinal cross-sectional view of the feeder taken along the line VI—VI of FIG. 10.

FIG. 13 is a front view of the above fish-feeder in an upright portion after having settled into the water.

FIG. 14 is a cross-sectional view of the above feeder showing its condition after the bait has been discharged downwardly with the bottom lid being opened.

DETAILED DESCRIPTION OF THE INVENTION

Figure 5B:
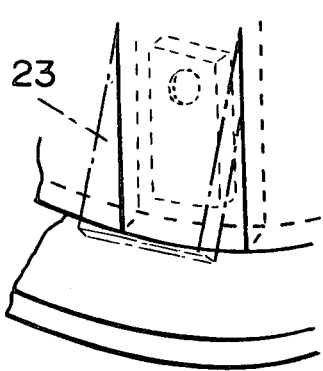
FIG. 5B is a partially enlarged perspective view of the feeder in the FIG. 5A and showing the swinging plate.

FIRST EMBODIMENT:

Referring to FIG. 1 and FIG. 3, numeral 1 indicates a bell-shaped container with a number of apertures 2 formed along the entire circular periphery thereof. An elongated sleeve 3 disposed in the container 1 is concentric with the container 1 and has one end secured to the inner top portion of the container 1. Numeral 4 indicates a suspending means which is shaped like a pincette having a distal end formed like Ω and is slidably disposed in the sleeve 3. The other end of the suspending means 4 protrudes from the top of the bell-shaped container 1 and is shaped like a ring for preventing the further lowering of the suspending means 4 into the container.

Figure 6:
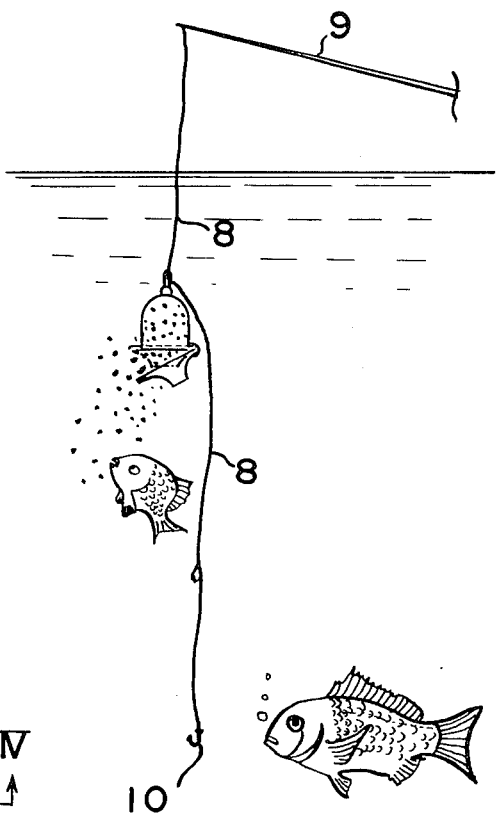
FIG. 6 is a schematic view showing the feeder according to the first and second embodiment in practical use.

Numeral 5 indicates a bottom lid which comprises an upwardly and outwardly extending circular peripheral portion and a bottom plate. This bottom lid 5 is hinged to the container 1 by a hinge means 6 permitting the swinging movement of the bottom lid 5. This bottom lid 5 also comprises a sleeve 7 which extends into the middle portion of the lid 5 and which is parallel to the bottom plate of the bottom lid 5. As shown in FIG. 6 numeral 8 indicates a line and numeral 9 shows a rod. Numeral 10 indicates a hook.

As best can be seen in FIG. 3, opening of the bottom lid 5 is prevented by suspending means 4 which softly but without fail holds the sleeve 7.

The manner in which the device operates is as follows:

i. The bottom lid 5 is opened and the proper amount of bait is placed into the container 1.

ii. The bottom lid 5 is reclosed with the sleeve 7 being held by the suspending means 4.

iii. The fish-feeder is suspended by the line 8 and is cast into the water.

iv. When the fish-feeder is settled to a desired position in the water, the line 8 is jerked by a rod 9 so as to cause the surrounding water to flow against the upper portion of the peripheral brim of the bottom lid 5, whereby the sleeve 7 is released from the suspending means 4 resulting in the opening of the lid 5 and the bait is discharged downwardly into the water from the container 1.

Since the settling bait conceals the fishline 8 and the hook 10, a fish bites the hook 10 without being aware of the hook.

SECOND EMBODIMENT

As shown in FIG. 5A and FIG. 5B, the construction of the fish-feeder of this embodiment is similar to that of the first embodiment with the exception of the opening means.

In this second embodiment, as best can be seen in FIG. 5A, a perpendicular plate 21 having a protruding portion 22, which juts from the rim of the bottom lid 15 is latchedly engaged with a bottom part 23 of the circumferential wall which has both sides longitudinally slitted so as to swing inwardly or outwardly. The manner in which the device is operated is as follows:

i. The bottom lid 15 is opened and the proper amount of bait is placed into the container.

ii. The bottom lid 15 is reclosed having the perpendicular plate 21 engaged with the bottom part 23.

iii. The fish-feeder is suspended by a line 18 and is cast into the water.

iv. When the fish-feeder is settled to a desired position in the water, the line 18 is jerked by a rod so as to cause the surrounding water to flow against the upper portion of the peripheral brim of the bottom lid 15, whereby the bottom part 23 is swung outwardly giving rise to the opening of the lid 15 and the bait is discharged downwardly into the water from the container 11.

THIRD EMBODIMENT

Figure 7:
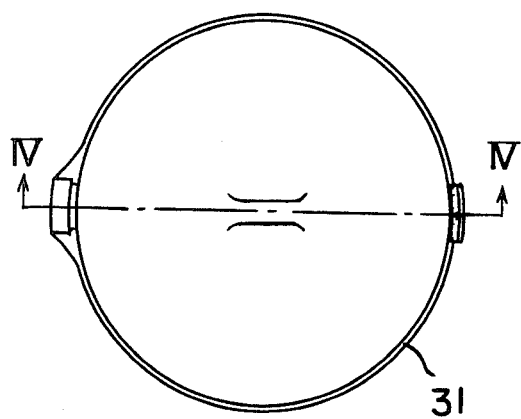
FIG. 7 is a plan view of a fish-feeder according to a third embodiment of the present invention.
Figure 9:
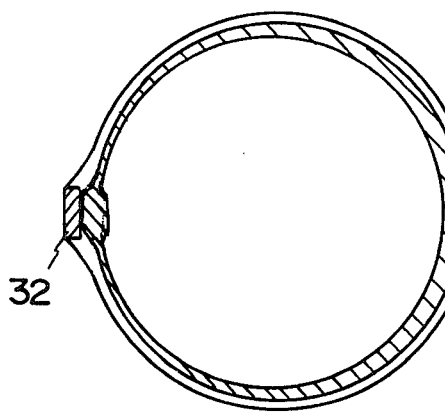
FIG. 9 is a transverse cross-sectional view of the fish-feeder taken along the line V—V of FIG. 8.
Figure 8:
FIG. 8 is a longitudinal cross-sectional view of the fish-feeder taken along the line IV—IV of FIG. 7.
Figure 11:
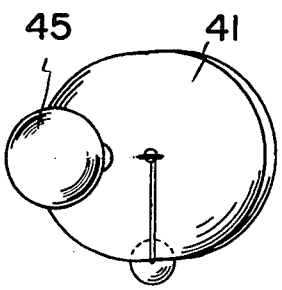
FIG. 11 is a plan view of the fish-feeder shown in FIG. 10.

Referring to FIGS. 7, 8 and 9, numeral 31 indicates a bell-shaped container which is made of flexible material. The wall of the container 31 is of decreasing thickness with the hinge side being the thickest and the latch side being the thinnest.

On the thinnest or lip side, a latch is formed by a performed lip 33 on the edge of the body which is mated to a concave recess 34 preformed as part of a lid 35. On the thickest or hinge side, the lid 35 is pivotally secured to the bottom end of the container 31 by a hinge means 36. Numeral 37 indicates a lug which is formed on the top of the container 31 and which has an opening therein. The operation of the third embodiment is as follows:

i. The bottom lid 35 is opened and the proper amount of bait is charged into the container 31.

ii. The bottom lid 35 is reclosed having the lip 33 disposed in the concave recess 34.

iii. The feeder is cast into the water and allowed to sink to a predetermined position.

iv. The surrounding water causes pressure upon the thinnest side of the container 31 and causes an inward deflection of the thinnest side whereby the lip 33 is released from the recess 34 giving rise to the opening of the lid 35. The bait is thereby discharged downwardly into the water from the container 31. In other words because the lid is made of very heavy material, it is not effected by the pressure but the lip 33 separates from the recess 34 causing the lid 33 to open on the hinge 36. As the lid opens, the bait falls in the direction of the hook as in previous embodiments.

FOURTH EMBODIMENT

Referring to FIG. 10 to FIG. 15, numeral 41 indicates a bell-shaped container in a slanted condition. A concentric sleeve 42 is disposed in the container 41 and is integral with the container 41. Numeral 44 is a float which comprises a float portion 45, a sleeve portion 46 and a radially-expanded portion 47. A bottom lid 48 has a portion of its upper end pivotally secured to a portion of the bottom end of the container 41 by a hinge means 49. Numeral 43 is a plug reinforcing sleeve 46.

Numeral 50 indicates a shaft means which protrudes perpendicularly from the base of the bottom lid 48 and is slidably disposed in the sleeve portion 46.

A ring 51 is fixedly secured to the eccentric shoulder portion of the container 41. Numeral 52 indicates a first line which has one end tied to the ring 51.

Numeral 53 is a fishing pole. Numeral 54 is a second line extending downwardly from the ring, holding sinker 55 and a hook 56 therebelow.

Figure 15:
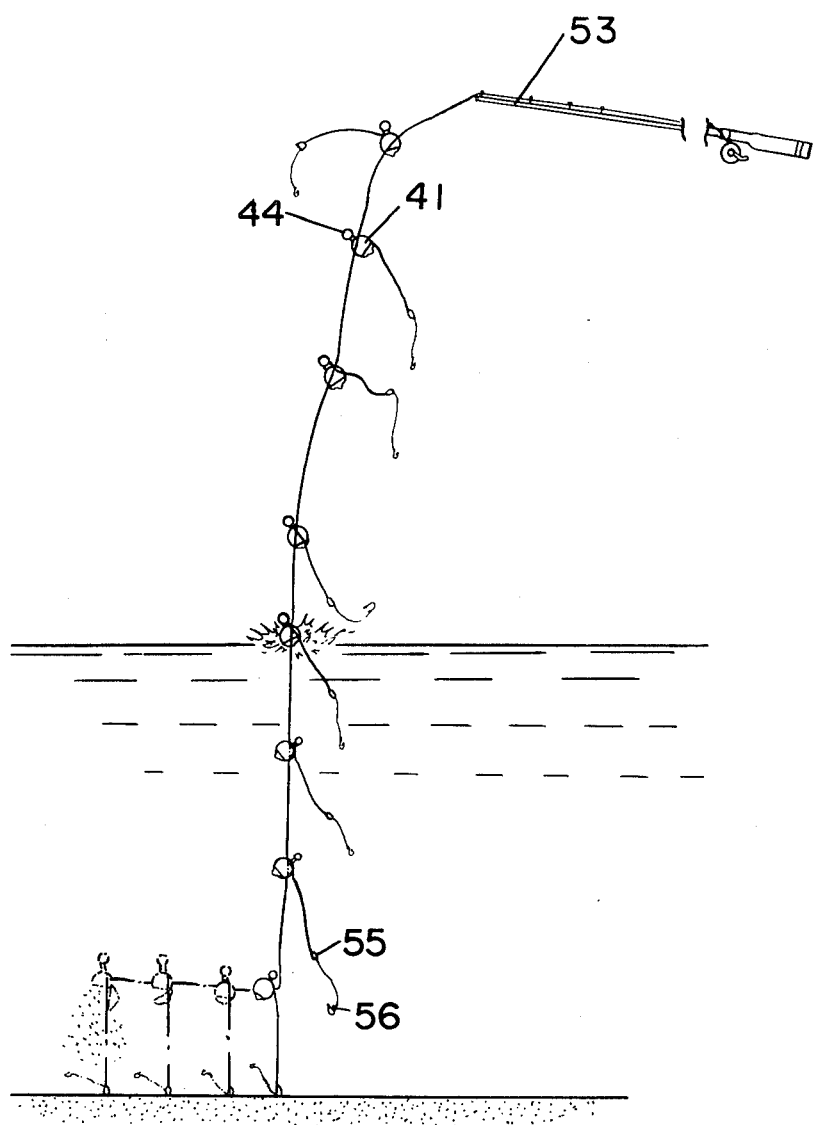
FIG. 15 is a schematic view showing how a plurality of feeders according to the present invention are operated in the water.
Figure 17:
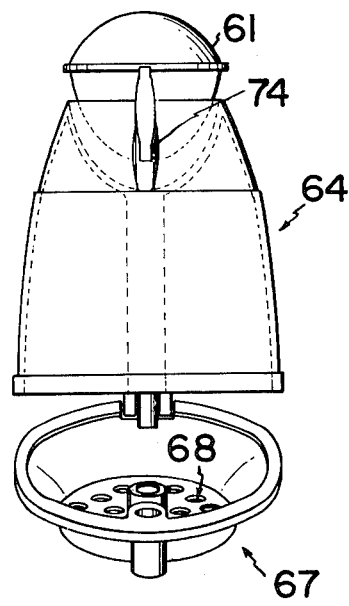
FIG. 17 is a side view of fish feeder shown in FIG. 16.
Figure 16:
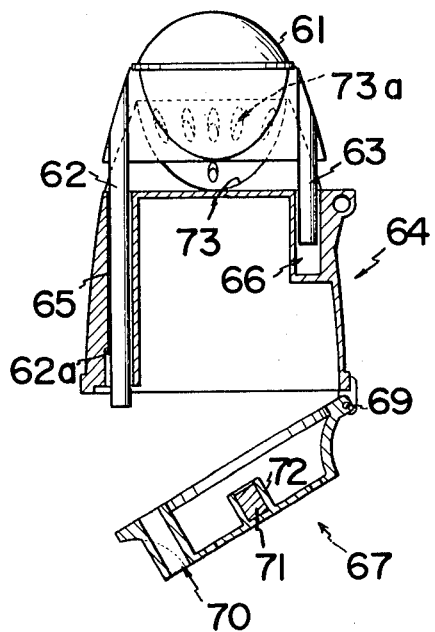
FIG. 16 is a front view, partially in section, of a modified fish-feeder of the fourth embodiment.

The manner in which the apparatus is operated is as follows:

i. The bottom lid 48 is opened and the proper amount of bait is charged into the container 41.

ii. The bottom lid 48 is reclosed having the shaft 50 loosely disposed in the sleeve portion 46.

iii. The fish-feeder is suspended by the line 52 and is cast into the water by the rod 53. When suspended by the line 52, the feeder will be located in a slanted position. Therefore, when it is cast into the water, it sinks into the water without the shaft 50 disengaging from the sleeve portion 46.

iv. During the settling of the feeder, the latter maintains the slanted position and the bottom lid 48 is kept closed because the weight of the sinker 55 is greater than buoyancy of the float portion 45.

v. When the sinker 55 contacts the bottom or the bed, the feeder stops descending and simultaneously changes its position to an upright position because of the buoyancy of the float 44. Furthermore, the same buoyancy of the float 44 pulls up the sleeve 46 disengaging the shaft 50 from the sleeve 46 and the bottom lid 48 is opened as shown in FIG. 15 to discharge the bait downwardly.

A modification of this embodiment is included in FIG. 16 through FIG. 19 wherein the improvement is characterized in that a longitudinal shaft means which has one end secured to a float and its other end slidably disposed within a recess formed in a bottom lid is eccentrically disposed relative to the longitudinal axis of a container, whereby the amount of bait charged into the container can be increased as compared to the previous embodiment and the pivoting movement of the bottom lid is also facilitated.

In FIGS. 16 to 19, numeral 61 indicates a float which has secured thereto two spaced apart longitudinal long and short shafts 62 and 63 respectively, numeral 64 indicates a container which is provided with elongated recesses 65 and 66 through which the respective long and short shafts 62 and 63 pass, and numeral 67 indicates a bottom lid which has a portion of the upper periphery thereof pivotally connected to the corresponding lower periphery of container 64 by means of a pin 69. This bottom lid 67 is preferably provided with a plurality of apertures 68 for introducing water into container 64.

Figure 18:
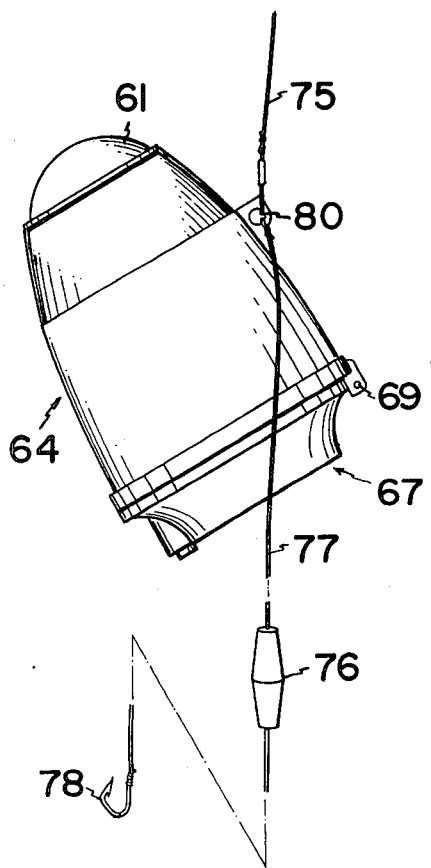
FIG. 18 is a front view of above fish feeder in an inclined position with the bottom lid closed.

Numeral 70 indicates a recess formed in the bottom lid 67 through which shaft 62 passes after passing through the coaxial recess 65 in container 64. Thus, container 64 and bottom lid 67 are temporarily engaged with each other when the float 61 is in its lower position as shown in FIG. 18. This temporarily engagement maintains the lid 67 in its closed position because the lower longitudinal end portion of shaft 62 is disposed in the recess 70 in the lid 67.

Figure 19:
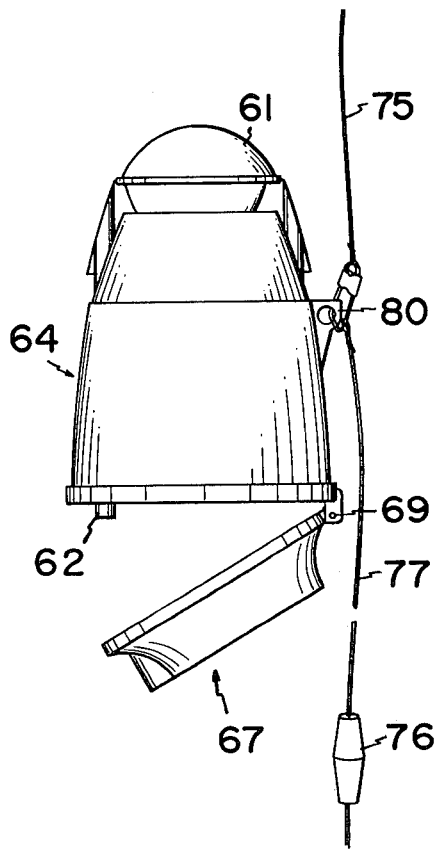
FIG. 19 is a front view of above fish feeder with the bottom lid thereof in an opened position.

This temporary engagement is not disengaged until float 61 moves upwardly due to the buoyancy caused by the water pressure acting on the float 61 whereby the latter is raised or moved relative to the container 64 to the position shown in FIG. 19 such that the lower longitudinal end of shaft 62 is withdrawn from recess 70 in the lid 67.

Numeral 71 indicates a weight such as lead fixedly disposed within a recess 72 formed in the central portion of bottom lid 67 for facilitating the swinging movement of the lower lid 67.

The fish feeder of this modification is further provided with an advantageous construction for making the movement of the float stable wherein numeral 73 indicates a round recess in the container 64 which stably receives a round bottom portion of float 61 and which has apertures 73a formed therein for introducing water into the container 64 and numeral 74 indicate longitudinal slits formed on the sides of container 64 for receiving side portions of float 61.

Numeral 62a indicates a radial protrusion formed on the longitudinal end of shaft 62 for preventing shaft 65 from passing out through the recess 65 in container 64. The protrusion 62a may be formed in place after assembly of the float 61 on the container 64.

With respect to other auxiliary parts of the embodiment of the fish feeder shown in FIGS. 16 to 19, numeral 75 indicates a first line for suspending container 64, numeral 76 indicates a sinker, numeral 77 indicates a second line, and numeral 78 indicates a hook.

Due to the above construction, when the distal end of the first line 75 is connected to a ring 80 provided at the shoulder portion of container 64, the first line 75 is positioned offcenter relative to the longitudinal of axis container 64, such that the container 64 assumes a slanted or tilted position relative to the upright first line 75 when the container is suspended as shown in FIG. 18.

In the above situation, since the longitudinal axis of the shaft 62 and the coincident longitudinal axes of the recesses 65 and 70 are disposed at an acute angle relative to vertical and relative to the generally vertical first line 75 as shown in FIG. 18, the shaft 62 will not be moved longitudinally in the recesses 65 and 70 and the lid 67 will remain closed due to the engagement of the longitudinal end of shaft 62 in the lid recess 70. Thus when the fish feeder is initially placed in the water and it begins to descent into the water, the fish feeder will assume the position shown in FIG. 15 wherein the longitudinal axis of the fish feeder is disposed at an acute angle relative to vertical and the lid will remain closed.

The reason that the float 61 does not rise relative to the container when in the water is that the friction between shaft 62, 63 and recesses 65, 66 would preclude such separation of the float relative to the container 64 because the friction force is generally greater than the buoyancy which affects the float in the slanted position in the manner described in view of FIG. 15.

However, when the sinker 76 reaches bottom, the fish feeder, will become stationary and turn to an upright position as shown in FIG. 19 due to the buoyancy of the float 61. When the fish feeder takes on the upright position shown in FIG. 19, the buoyancy of float 61 will cause the float 61 to rise relative to container 64, whereby the shaft 62 will be withdrawn from the recess 70 in lid 67 and the latter will pivot open as shown in FIG. 19 to discharge the bait from the bottom of the container 64.

Figure 20:
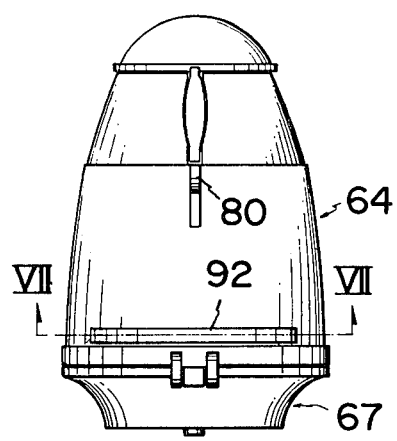
FIG. 20 is a side view of the above fish feeder which is provided with a screen means.
Figure 21:
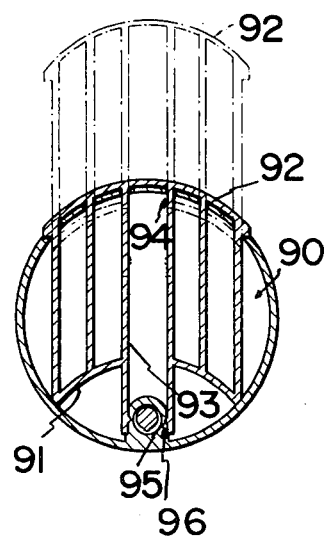
FIG. 21 is a transverse cross sectional view of the fish feeder taken along the line VII—VII of FIG. 20.

The modified fish feeder may be further provided with screening means within the container as shown in FIG. 20 and FIG. 21 for discharging the bait gradually from the container wherein numeral 90 indicates a skeleton-like screen. The screen 90 which substantially comprises arcuate ribs 91 and 92 and longitudinal straight ribs 93 is inserted into container 64 through a lateral aperture 94 formed in the lower portion of container 64 parallel to the end periphery of container 64 until protrusions 95 are snappingly engaged within recess 96 formed on the sides of sleeve 65. The arcuate rib 91 is shaped such that it almost corresponds to the shape of an arcuate peripheral portion of the container 64.

It is needless to say that the short shaft of the above fish feeder may be replaced with another shaft which has the same length as that of the long shaft so that the floating of the float may be further facilitated.

What is claimed is:

1. A fish feeder comprising a container having an open bottom, a bottom lid element pivotally mounted on said container such that bait is adapted to be contained in said container when the lid element is in a closed position and to be released from the container when the lid is in an open condition, a float element movably mounted on said container, and operable means operable to maintain the lid element closed and to provide for opening of said lid element, said operable means comprising a shaft means on one of said elements and a recess means on the other of said elements, said shaft means being mated with said recess means to maintain said lid element in said closed condition, said float element being connected to one of said means and being operable to unmate said shaft means and recess means to thereby open said lid element.

2. A fish feeder according to claim 1 wherein said recess means comprises a recess in said lid element.

3. A fish feeder according to claim 2 wherein said container is provided with an elongated passage, said shaft means comprising a shaft extending from said float element and slidably mounted on said elongated passage in said container.

4. A fish feeder according to claim 3 wherein said container has a longitudinal axis, said elongated passage being spaced from said longitudinal axis.

5. A fish feeder according to claim 3 wherein said recess in said lid element, said elongated passage in said container and said shaft are coaxially disposed along an axis eccentrically disposed relative to the longitudinal axis of said container.

6. A fish feeder according to claim 3 wherein said float element is provided with a second shaft and said container is provided with a second elongated passage in which said second shaft is accommodated.

7. A fish feeder according to claim 1 wherein said float element is mounted on top of said container.

8. A fish feeder according to claim 1 wherein said recess means comprises a sleeve mounted on said float element, said sleeve being slidably mounted on said container, said shaft means comprising a shaft mounted on said lid element, said sleeve being adapted to rise due to the buoyancy of the float element to thereby release said sleeve from said shaft to thereby open said lid element and release bait from the container.

9. A fish feeder according to claim 1 wherein said container has connecting means thereof for connection to a fishing line and to a sinker, said connecting means being spaced from the longitudinal axis of said container such that when descending in water due to the weight of the sinker, the container will be disposed with the axis of the container tilted at an acute angle relative to vertical.

10. A fish feeder according to claim 9 wherein when the sinker touches bottom and the fish feeder no longer descends, the water will act on the buoyant float element to thereby orient the container so that its longitudinal axis is substantially vertically disposed, whereby the float element will rise relative to the container to thereby unmate said shaft means and recess means to open said lid element.

* * * * *